United States Patent
Andersen

(10) Patent No.: US 7,542,649 B1
(45) Date of Patent: Jun. 2, 2009

(54) OPTICAL FIBER LINE CARD ASSEMBLY

(75) Inventor: Michael Norgaard Andersen, Copenhagen (DK)

(73) Assignee: OFS Fitel LLC, Norcross, GA (US)

( * ) Notice: Subject to any disclaimer, the term of this patent is extended or adjusted under 35 U.S.C. 154(b) by 0 days.

(21) Appl. No.: 12/038,699

(22) Filed: Feb. 27, 2008

(51) Int. Cl.
G02B 6/00 (2006.01)
(52) U.S. Cl. ........................ 385/135; 385/137
(58) Field of Classification Search ............. 385/135, 385/137
See application file for complete search history.

(56) References Cited

U.S. PATENT DOCUMENTS

| | | | |
|---|---|---|---|
| 4,585,303 | A | 4/1986 | Pinsard et al. |
| 5,052,775 | A | 10/1991 | Bossard et al. |
| 5,127,082 | A | 6/1992 | Below et al. |
| 5,724,469 | A * | 3/1998 | Orlando ............. 385/135 |
| 6,408,124 | B1 * | 6/2002 | Holman et al. ............. 385/135 |
| 6,643,444 | B1 | 11/2003 | Putnam |
| 6,678,457 | B2 | 1/2004 | Kim et al. |
| 6,996,322 | B2 | 2/2006 | Bennett et al. |
| 7,116,885 | B2 * | 10/2006 | Brown et al. ............... 385/137 |

* cited by examiner

Primary Examiner—Frank G Font
Assistant Examiner—Robert Tavlykaev
(74) Attorney, Agent, or Firm—Jacobs & Kim LLP; Daniel Kim, Esq.

(57) ABSTRACT

In a line card assembly, an optical fiber spool is mounted directly onto the back of a line card panel, thereby avoiding the use of a printed circuit board as a structural base. The line card assembly includes a hub having an outer circumference and first and second ends, and a longitudinal axis extending between the first and second ends. First and second plates are located, respectively, at the first and second ends of the hub, transversely to the hub's longitudinal axis. Each of the first and second plates has an outer perimeter including at least one straight outer edge, a straight outer edge of the first plate being aligned with a straight outer edge of the second plate, such that the hub, first plate, and second plate together form a spool with at least one squared-off side. A collar is mounted to the first and second plates, the collar extending at least part way around the perimeter of the first and second plates. The collar includes a structural interface for attaching a line card panel thereto, the attached line card panel covering the squared-off side of the spool, the first plate, second plate, collar, and line card panel forming an enclosure around an optical fiber wound onto the hub.

14 Claims, 6 Drawing Sheets

OPTICAL FIBER LINE CARD ASSEMBLY

BACKGROUND OF THE INVENTION

1. Field of the Invention

The present invention relates generally to optical fiber devices and methods, and in particular to improved systems and methods for loading an optical fiber into a line card assembly.

2. Description of Prior Art

A module in an optical fiber transmission system typically includes a number of components loaded onto line cards that are mounted into receiving slots on a chassis. These components include segments of optical fiber. Because of their length, these segments of optical fiber are typically wound onto spools that are then mounted onto a printed circuit board (PCB). A line card panel is attached to the PCB, allowing the spool of optical fiber to be loaded into a line card slot.

It is desired to improve the described technique. In particular, the described technique suffers from an inefficient use of space and materials, which is significant because of the highly competitive nature of the fiber optics industry. There is an ongoing need to reduce manufacturing costs, while at the same time developing products with increased efficiency and flexibility.

SUMMARY OF THE INVENTION

These and other issues of the prior art are addressed by the present invention, one aspect of which provides a line card assembly in which an optical fiber spool is mounted directly onto the back of a line card panel, thereby avoiding the use of a printed circuit board as a structural base. The described line card assembly comprises a hub having an outer circumference and first and second ends, and a longitudinal axis extending between the first and second ends. First and second plates are located, respectively, at the first and second ends of the hub, transversely to the hub's longitudinal axis. Each of the first and second plates has an outer perimeter including at least one straight outer edge, a straight outer edge of the first plate being aligned with a straight outer edge of the second plate, such that the hub, first plate, and second plate together form a spool with at least one squared-off side. A collar is mounted to the first and second plates, the collar extending at least part way around the perimeter of the first and second plates. The collar includes a structural interface for attaching a line card panel thereto, the attached line card panel covering the squared-off side of the spool, the first plate, second plate, collar, and line card panel forming an enclosure around an optical fiber wound onto the hub.

Additional features and advantages of the present invention will become apparent by reference to the following detailed description and accompanying drawings.

DETAILED DESCRIPTION

Aspects of the present invention provide an optical fiber line card assembly with an integrated spool. As mentioned above and described in greater detail below, in a line card assembly according to an aspect of the invention, an optical fiber spool is mounted directly onto the back of a line card panel, thereby avoiding the use of a printed circuit board (PCB) as a structural base. The integration of the spool into the line card assembly results in a significant increase in the efficient use of space and materials, compared with prior art line cards.

Figure 1:
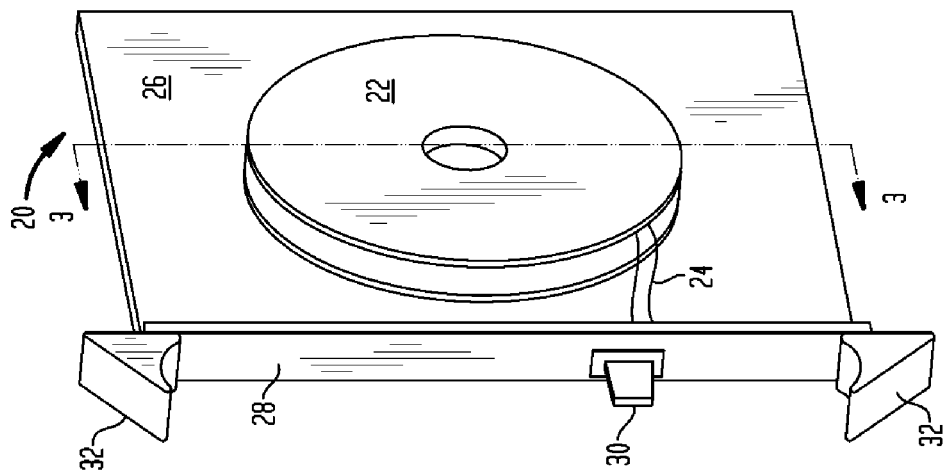
FIG. 1 shows an isometric view of an exemplary optical fiber line card according to the prior art.
Figure 3:
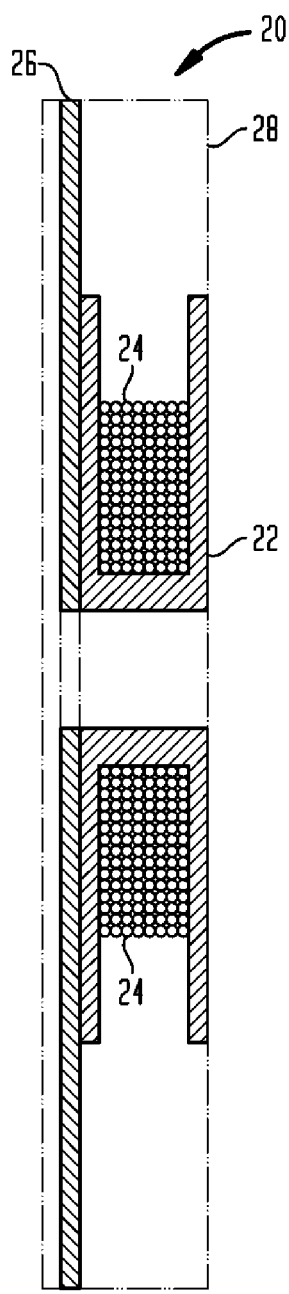
FIG. 3 shows a cross section of the line card shown in FIG. 1 through the plane 3-3.

FIGS. 1 and 3 show, respectively, an isometric view and a cross section of an exemplary optical fiber line card 20 according to the prior art. The line card 20 includes a standard spool 22, on which an optical fiber 24 has been wound. Both ends of the optical fiber are accessible.

The spool 22 is mounted onto a printed circuit board (PCB) 26. A line card panel 28 is attached to one edge of the PCB 26. The line card panel 28 includes a connector 30 that is connected to the ends of the optical fiber 24. The line card panel 28 further includes a pair of locking clips 32 that are used to hold the line card 20 in place after it has been positioned in a chassis slot.

Figure 2:
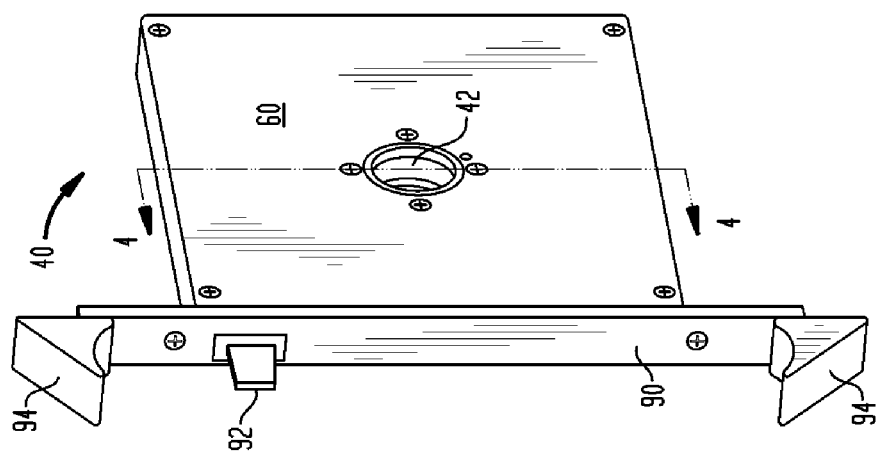
FIG. 2 shows an isometric view of an optical fiber line card according to an aspect of the present invention.
Figure 4:
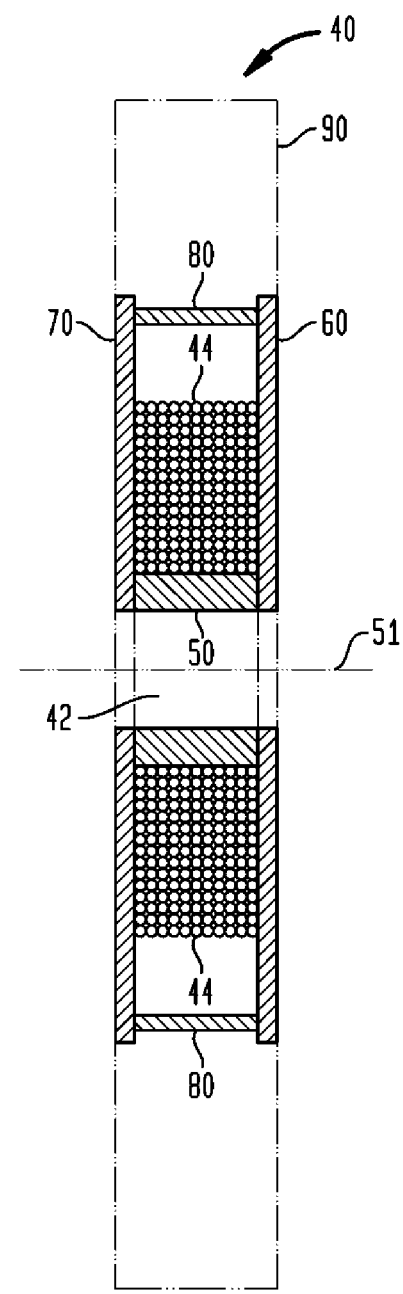
FIG. 4 shows a cross section of the line card shown in FIG. 2 through the plane 4-4.
Figure 5:
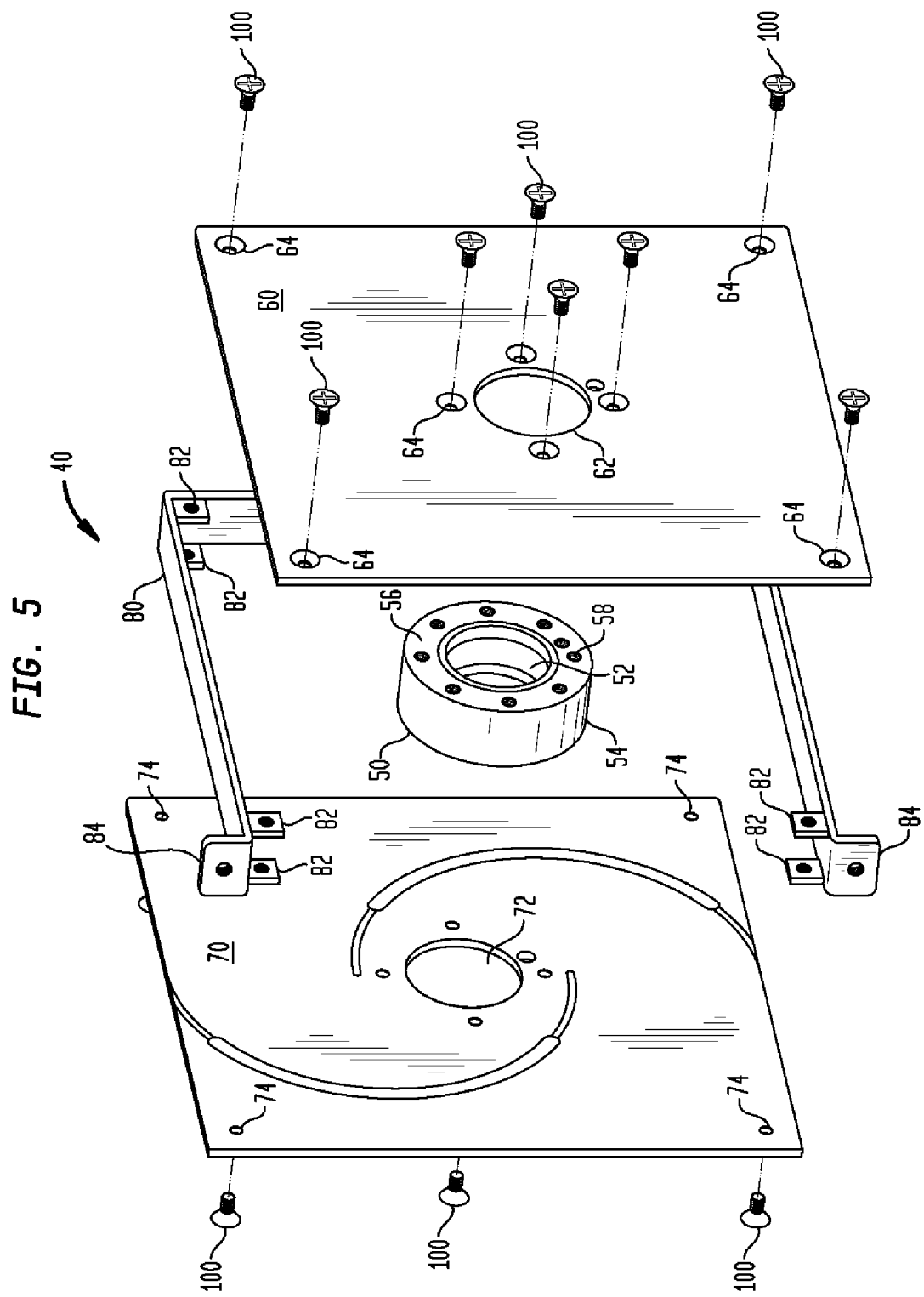
FIG. 5 shows an exploded view of the line card shown in FIG. 2, without the line card panel.
Figure 6:
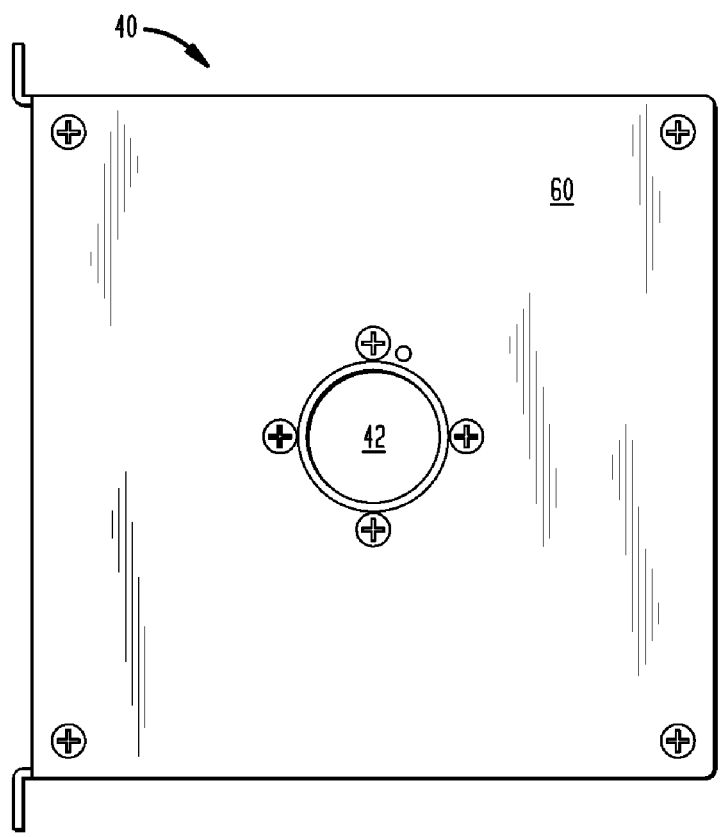
FIGS. 6 and 7 show, respectively, a side view and a front view of the line card shown in FIG. 2, with the line card panel removed.
Figure 7:
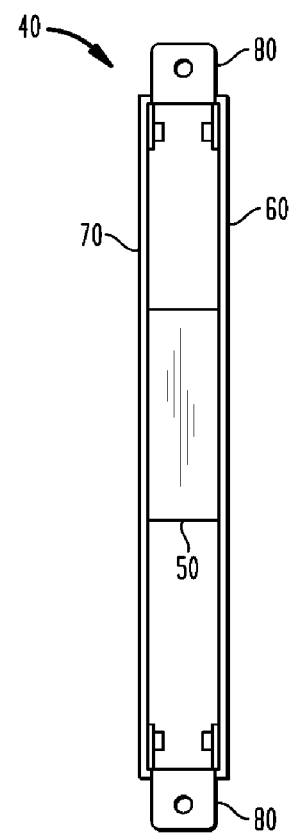

FIGS. 2, 4, and 5 show, respectively, an isometric view, a cross section, and an exploded view of an optical fiber line card 40 according to an aspect of the present invention. The line card 40 includes a central hub 50, a first plate 60, and a second plate 70 that together form a spool. The first plate 60 and second plate 70 are the same size, and each has a square perimeter. The square edges of the first and second plates line up with each other. In the described example of the invention, the hub 50, first plate 60, and second plate 70 are separate units that are mounted to each other to form a spool. However, it will be appreciated that aspects of the present invention would also apply to a spool having an integrally formed hub and end plates.

The hub 50 and plates 60 and 70 have respective central holes 52, 62, and 72 that line up with each other when the spool is assembled to form a single spindle hole 42. The spindle hole 42 can be used to load the spool onto a mating spindle in an optical fiber winding machine. The spindle hole 42 may also be used for other purposes, such as to facilitate stacking or storage of assembled spools.

The line card 40 further includes a collar 80 that is dimensioned to fit closely between the first and second plates. The collar 80 extends around three sides of the first and second plates 60 and 70. The collar 80 includes a first structural interface 82 for mounting the collar 80 to the first and second plates. The collar 80 includes a second structural interface 84 for mounting the collar 80 to a line card panel 90. In the presently described example of the invention, the first and second structural interfaces are provided by a series of tabs extending perpendicularly outward from the body of the collar 80. However, it will be appreciated that other types of structural interfaces may also be used.

Comparing FIG. 3 and FIG. 4, it will be seen that a line card according to the present invention uses space more efficiently that a line card according to the prior art. It will be seen in FIG. 3 that in a prior art line card a significant amount of space is occupied by the PCB, plus any clearance required to allow the PCB to be attached to the line card panel. In FIG. 4 line card 40, the first and second plates are substantially flush with the outer edges of the line card panel, thereby maximizing the amount of space available for the spool formed by hub 50 and plates 60 and 70. The entire width of the line card is available for the spool. In addition, by eliminating the PCB, it will be seen that the FIG. 4 line card uses less material than the FIG. 3 line card.

Each of the structural components of the present invention is now described in greater detail, starting with the hub 50. As shown in FIGS. 4 and 5, hub 50 has a generally cylindrical shape, with a longitudinal axis 51 and a smooth, continuous outer circumference 54. The diameter of the hub 50 is sufficiently large to reduce the risk of bending losses when an optical fiber is wound around it. The hub 50 is fabricated from plastic, or other suitable material, and is sufficiently smooth to prevent damage to an optical fiber wound around the hub.

The first and second ends of the hub 50 are generally perpendicular to the hub's longitudinal axis 51. The hub ends have a circular perimeter and include substantially flat, ring-shaped surfaces 56 that respectively receive first and second plates 60 and 70. The flat surfaces of the first and second ends of the hub are generally parallel with each other.

According to the presently described aspect of the invention, the hub 50 and the first and second plates 60 and 70 are attached to each other by a plurality of screws 100. Accordingly, a plurality of screwholes 58 are provided that are suitably arranged around the spindle hole 52. Further, there may be provided suitable mating structures on one or both of the first and second end surfaces of the hub and the corresponding surfaces on the first and second plates to ensure proper alignment, and to increase the strength of the structure.

Although screws are shown, other techniques may be used to attach the end plates to hub 50. Also, as mentioned above, it would be possible to form the hub and end plates as a single unit, molded out of plastic.

The first and second plates 60 and 70 have a generally square shape with four vertices. The plates may be fabricated from plastic or other suitable material. In addition, the plates may include ribs or other reinforcing structures to increase their strength and rigidity. Also, an identifying label may be placed onto one or both of the plates.

It will be appreciated from the present description that it would be possible to modify plates 60 and 70 and collar 80 so that the plates have a shape other than a square shape. In this modified version, however, the spool assembly should still have at least one squared-off side against which the line card panel would be mounted. This would be accomplished by providing each of the first and second plates with at least one straight edge, and lining up at least one straight edge of the first plate with a corresponding straight edge of the second plate. The modified collar would have a gap corresponding in position to squared-off side of the spool. The line card panel would be attached to the collar, bridging the gap and covering the squared-off size of the spool. Further, it would be desirable for the modified shape to be symmetrical to facilitate the winding of optical fiber onto the spool.

The collar includes a first set of tabs 82 providing a structural interface with the first and second plates 60 and 70. The tabs 82 include screwholes 83 to allow the plates 60 and 70 to be securely attached to the collar 80 using screws that are threaded through screwholes 64, 74, and 83 or other suitable attachment means.

The collar further includes a pair of tabs 84 at its front that provide a structural interface with a front line panel 90. Each of these tabs 84 has a screwhole 85 corresponding in position to screwholes 96 on the line card panel 90, allowing the panel 90 to be screwed to the collar.

The collar 80 serves a number of different functions. In addition to providing a structural interface for mounting the collar 80 to a line card panel 90, the collar 80 provides structural support to the first and second plates 60 and 70, thereby tending to prevent damage to the plates 60 and 70. In addition, in combination with the plates 60 and 70 and the line card panel 90, the collar 80 provides a substantially closed container for the optical fiber 44 wound onto the spool.

Figure 8:
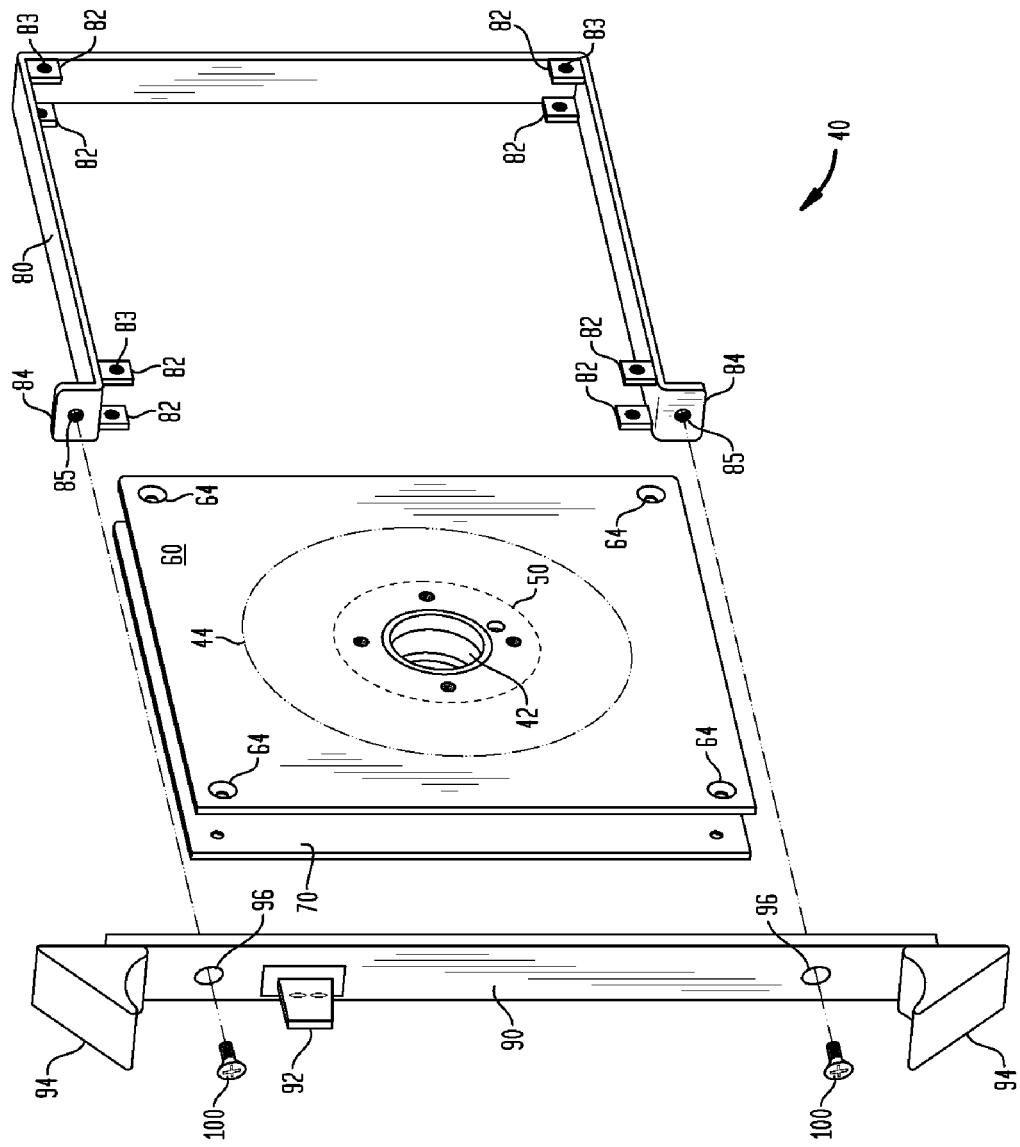
FIG. 8 shows a partially exploded view of the line card panel, illustrating how the collar, spool, and line card panel are attach

FIG. 8 shows a partially exploded view of the described line card, illustrating the assembly of the line card components into a finished unit. In FIG. 8, hub 50 and plates 60 and 70 have been assembled into a square-edged spool. The spool has then been loaded into a winding machine, and a suitable optical fiber 44 has been wound around the spool hub 50.

Collar 80 is now positioned between plates 60 and 70 to allow the screwholes 83 on tabs 82 to line up with corresponding screwholes on plates 60 and 70. Screws are then used to mount the collar to the first and second plates 60 and 70.

Figure 9:
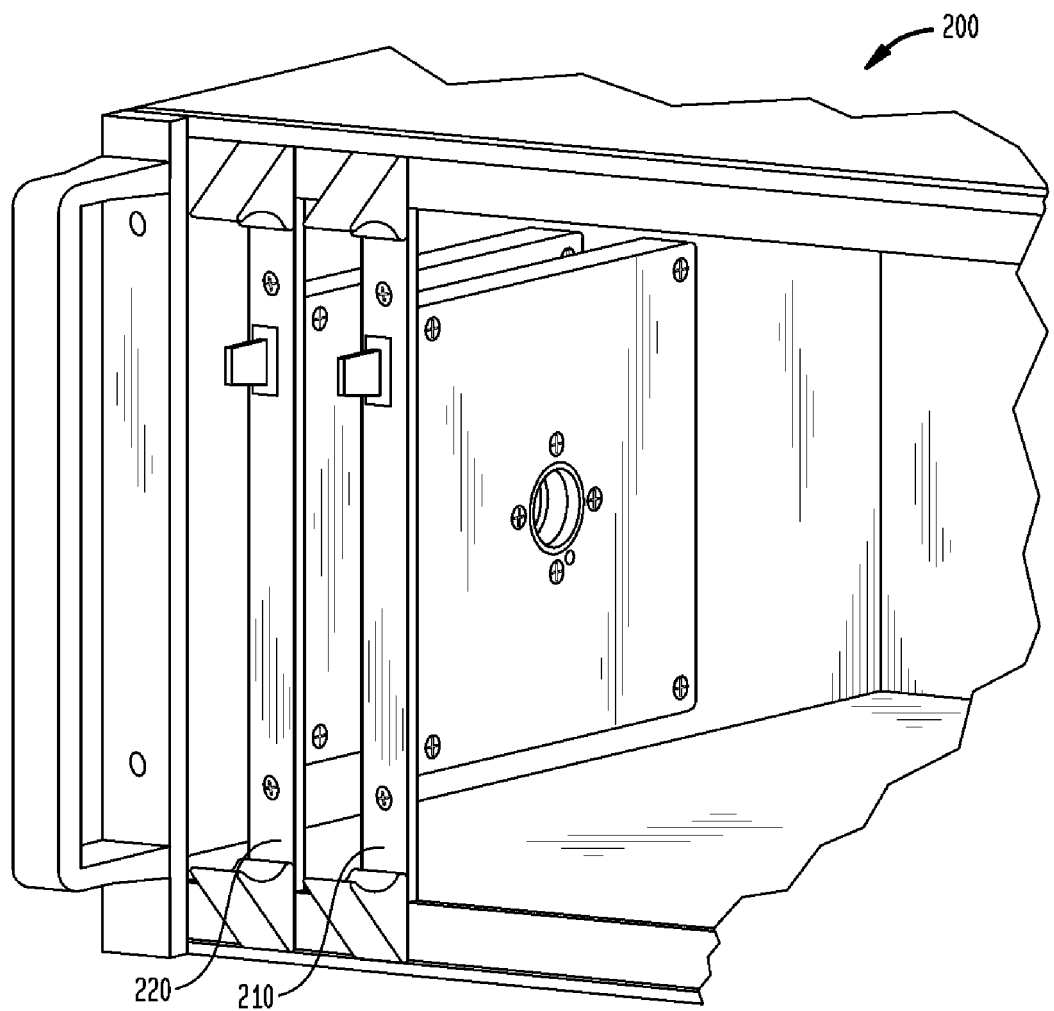
FIG. 9 shows a perspective view illustrating the line card panel loaded into a module chassis.

Finally, a line card panel 90 is provided. Any necessary connections are made between the optical fiber wound onto the spool and a terminal 92 on the line card panel. The panel is then positioned such that its screwholes 96 line up with the corresponding screwholes 84 on the collar, and then the line card panel 90 is screwed into place. The completed line card is now ready to be loaded into a receiving slot in a chassis. FIG. 9 is a perspective view of a chassis 200 in which there have been loaded two line cards 210 and 220 according to aspects of the presently described invention.

According to a further aspect of the invention, the described line card is the basis of an improved technique for loading an optical fiber into a line card.

First, a spool is provided having at least one squared-off edge, and an optical fiber is wound onto the spool.

Second, a collar is provided that fits closely between the spool plates, generally following their outer perimeter. The collar has a gap at a squared-off edge of the spool. The collar further has a structural interface for attaching a line card panel to the spool over the collar gap and over the squared-off edge of the spool to create an enclosure for optical fiber wound onto the spool.

Third, a line card panel is mounted to the collar's structural interface. This step includes making any necessary connections between the optical fiber and a terminal on the line card panel.

It will be appreciated that the present described line card has a number of advantages for both customers and manufacturers.

From the customer's point of the view, the described line card assembly simplifies the mechanical problem of loading an optical fiber into a line card module. In particular, there is no need for a PCB. Also, the optical fiber spool can be mounted directly onto a customer-specific line card front panel. A manufacturer is able to deliver a completed assembly that is ready to be plugged into a module. Further, the described line card optimizes the space in line card systems. The entire line card width is allocated to the spool, which also acts as a box or enclosure for the fiber.

From the manufacturer's point of view, the described line card provides a competitive advantage. The line card provides a reduction in manufacturing costs, and also reduces space requirements, which are important parameters in the industry, etc.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A line card assembly, comprising:
    a hub having an outer circumference and first and second ends, and a longitudinal axis extending between the first and second ends; and
    first and second plates located, respectively, at the first and second ends of the hub, transversely to the hub's longitudinal axis, each of the first and second plates having an outer perimeter including at least one straight outer edge, a straight outer edge of the first plate being aligned with a straight outer edge of the second plate, such that the hub, the first plate, and the second plate together form a spool with at least one squared-off side, the spool formed by the hub, the first plate, and the second plate being loadable into an optical fiber winding machine,
    a collar mounted to the first and second plates, the collar extending at least part way around the perimeter of the first and second plates,
    the collar including a structural interface for attaching a line card panel thereto, the attached line card panel covering the squared-off side of the spool,
    wherein the first plate, the second plate, the collar, and the line card panel form an enclosure around an optical fiber wound onto the hub, and the spool, the collar, and the line card panel are mountable to each other, without an additional base supporting structure, to form a line card assembly.

2. The line card assembly of claim 1, wherein the collar includes terminal ends forming a gap at the squared-off side of the spool, such that an opening is defined at the squared-off side of the spool by straight edges of the first and second plates, and by the terminal ends of the collar, the opening being covered by the attached line card panel.

3. The line card assembly of claim 2, wherein the collar structural interface is located at the collar's terminal ends.

4. The line card assembly of claim 1, wherein the first and second plates each have a square outer perimeter.

5. The line card assembly of claim 4, wherein the collar is shaped to extend around three sides of the square outer perimeters of the first and second plates.

6. The line card assembly of claim 1, wherein the hub, first plate, and the second plate are formed as separate units that are mounted to each other.

7. The line card assembly of claim 6, wherein the hub, the first plate, and the second plate are provided with a plurality of screwholes for receiving screws to mount them together.

8. The line card assembly of claim 1, wherein the spool includes a spindle hole extending through the hub, the first plate, and the second plate.

9. The line card assembly of claim 1, wherein the structural interface between the collar terminal ends and the line card panel comprises a tab at each terminal end, each tab including a hole for receiving a screw, the tab holes being positioned to align with corresponding screw holes in the line card panel.

10. An optical fiber spool, comprising:
    a hub having an outer circumference and first and second ends, and a longitudinal axis extending between the first and second ends; and
    first and second plates located, respectively, at the first and second ends of the hub, transversely to the hub's longitudinal axis, each of the first and second plates having an outer perimeter including at least one straight outer edge, a straight outer edge of the first plate being aligned with a straight outer edge of the second plate, such that the hub, the first plate, and the second plate together form a spool with at least one squared-off side, the spool being loadable into an optical fiber winding machine,
    the first and second plates each being attachable to a respective structural interface on a collar extending at least part way around the perimeter of the first and second plates,
    the collar including a structural interface for attaching a line card panel thereto, the attached line card panel covering the squared-off side of the spool,
    wherein the first plate, the second plate, the collar, and the line card panel form an enclosure around an optical fiber wound onto the hub, and the spool, the collar, and the line card panel are mountable to each other, without an additional base supporting structure, to form a line card assembly.

11. The optical fiber spool of claim 10, wherein the first and second plates have square outer perimeters.

12. The optical fiber spool of claim 10, wherein the spool includes a spindle hole extending through the hub, the first plate, and the second plate.

13. The optical fiber spool of claim 10, wherein the hub, the first plate, and the second plate are formed as separate units that are mounted together.

14. A method for fabricating a line card assembly, comprising:
    providing a spool having at least one squared-off side;
    winding an optical fiber onto the spool;
    attaching a collar to the spool, the collar extending at least part way around the spool's outer perimeter; and
    attaching a line card panel to the collar, such that the line card panel covers the squared-off side of the spool,
    wherein the spool, the collar, and the line card panel form an enclosure around the optical fiber wound onto the spool, and the spool, the collar, and the line card panel are mounted together, without a base supporting structure, to form a line card assembly.

* * * * *